No. 714,159. Patented Nov. 25, 1902.
A. DICKEY.
TAP HOLE PLUG.
(Application filed Dec. 2, 1901.)
(No Model.)

WITNESSES.
H. N. Jenkins
Warren C. Stone

INVENTOR:
Andrew Dickey
By Henry S. Blackmore
ATTORNEY.

UNITED STATES PATENT OFFICE.

ANDREW DICKEY, OF BUFFALO, NEW YORK.

TAP-HOLE PLUG.

SPECIFICATION forming part of Letters Patent No. 714,159, dated November 25, 1902.

Application filed December 2, 1901. Serial No. 84,448. (No model.)

*To all whom it may concern:*

Be it known that I, ANDREW DICKEY, a citizen of the United States, residing at 74 East Utica street, Buffalo, in the county of Erie and State of New York, have invented certain new and useful Improvements in Tap-Hole Plugs; and I do hereby declare the following to be a full, clear, and exact description of the invention, such as will enable others skilled in the art to which it appertains to make and use the same.

My invention relates to new and useful improvements in tap-hole plugs and process of making the same as applied to a means for reducing or melting metals by the use of which the metal may be retained or withdrawn from its container, as desired, without oxidation or contamination with foreign ingredients to an injurious degree or breaking of lining to tap the same, and which apparatus consists, essentially, of a reducing or melting pot lined with a material especially adapted to prevent contamination of the metal contained therein—such, for instance, as carbon—having an outlet from the lower part thereof provided with a removable plug or closure of reconstructed oxyhydrocarbon or cellular material, such as might be produced by forming the same of paper or similar manufactured substance capable of being transformed into carbon or friable charcoal by the application of heat in juxtaposition thereto.

By way of illustrating my invention and the manner in which the same is performed reference may be had to the accompanying drawings, of which—

Figure 1:
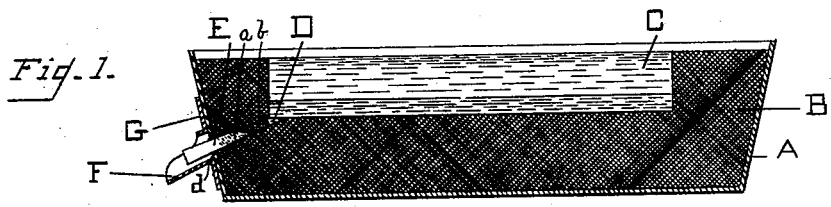
Figure 2:
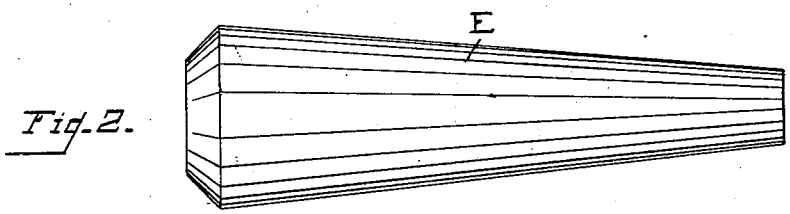
Figure 3:
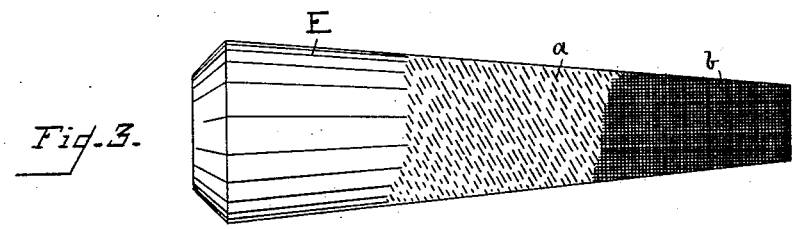
Figure 4:
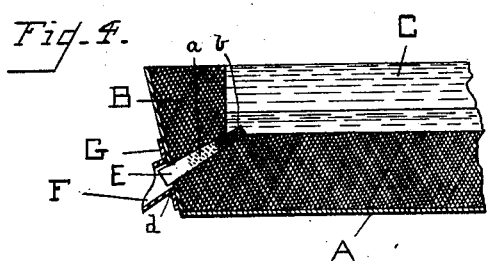
Figure 5:
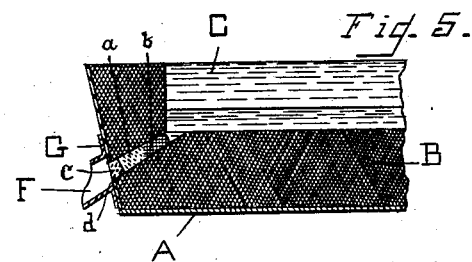

Figure 1 is a vertical longitudinal section of a reduction-pot provided with my improved tap-hole plug. Fig. 2 is an enlarged view of a green or unfinished plug composed of a material—such as compressed paper-pulp, sawdust, or other reconstructed or reassociated oxyhydrocarbon—capable of being transformed by the action of heat and exclusion of air into my improved tap-hole plug, as hereinafter set forth. Fig. 3 is an enlarged view of my improved tap-hole plug, clearly illustrating the component parts thereof. Fig. 4 is a view of a section of reduction-pot, showing my tap-hole plug inserted in the tap-hole thereof, the carbon $b$ extending into the molten metal contained therein. Fig. 5 is a similar view showing inserted in the tap-hole thereof a shorter plug having its outer end protected from contact with the atmosphere and consequent ignition when heated by a coating of impervious substance $c$.

Referring to the illustrations, the letter A designates a metallic pot or receptacle; B, the carbon lining of a reduction-pot; C, the molten bath therein containing metal; D, the tap-hole thereof; E, a green or unfinished plug for making my tap-hole plug or, as shown in Fig. 3, constitutes a part of the finished plug; F, a metal outlet-spout, and G a reinforcing-flange of the same.

Similar letters of reference illustrate corresponding parts in the various views.

My invention has particular reference to the reduction or melting of such metals as aluminium, which are prone to become contaminated with foreign substances, which render them practically valueless for many commercial purposes; but it is not limited thereto, as it may be employed for many other metals.

Heretofore in the reduction of aluminium by fusion and electrolysis serious difficulty has arisen in removing the reduced or molten metal from the pot or container in which it is retained, the usual method being to uncover the molten contents and ladle or dip the same out, which method, it can be readily seen, involves great loss, because the metal becomes oxidized and the bath cooled and chilled during the process of withdrawal. Up to the time of my original invention, which is covered by United States Letters Patent No. 602,575, dated April 19, 1898, it was considered impossible to provide a melting or reduction pot having a tap-hole or vent for drawing off the metal, for the reason that it had been found impossible to plug the same by any known means, because the intense heat would not permit the use of a metal plug or the use of clay, porcelain, or similar substances without contaminating the aluminium with the metal of the plug or some of the ingredients of the clay, such as silicon, to an injurious degree and the formation of dense and vitreous compositions, which could only be tapped by drilling therethrough and breaking linings, thus occasioning great loss and expense. In my previous patent cited I overcame this difficulty by the use of a wooden or charcoal plug. I have found, however, that reconstructed wood, cellulose, or similar oxyhydrocarbon may be effectively employed to advantage instead of the wooden or charcoal plugs, as previously claimed.

The object of my invention therefore is to employ in combination with a melting-pot lined with carbon or similar material, having an outlet from the lower part thereof, a removable plug or stopper composed of reconstructed or reassociated oxyhydrocarbon, such as cellulose, which is capable of being transformed into carbon or friable charcoal when heated, the principal advantage being that I can employ these plugs or stoppers made of compressed sawdust, paper-pulp, or similar material with or without a binding constituent of glutinous or similar character, which plug or stopper may be made from the refuse of woodworking establishments at a less cost than from wood direct, the said removable plug when adjusted in the melting pot or container being excluded when in use at the part heated to igniting temperature from the atmosphere by an impervious or air-excluding material, which will prevent the same from oxidizing or burning.

In the preparation of a reducing or melting pot and closure-plug of the character described I proceed as follows: First, I provide a pot or receptacle A, preferably of iron, adapted to be lined with carbon or carbonaceous material B. I then prepare a material for carbon lining B by taking ground carbon or coke, heating the same, and mixing it with a portion of fine quality of tar to a consistency of mortar—i. e., tar enough to act merely as a binder when baked. I then put a quantity of this mixture of tar and ground carbon in the iron receptacle A and tamp the same solidly on the bottom thereof. I then place upon this solid carbon base the mold or form of wood or other material of such size and shape as I desire to make the interior of the melting-pot and communicating therewith a tap-hole mold, preferably of conical or tapering form, extending in a downward direction through an opening or orifice $d$ in the lower side of the iron receptacle A. I then fill the space between the mold or form and the iron receptacle A with a mixture of tar and ground carbon, as before stated, preferably introducing a small quantity at a time and tamping the same until it becomes solid and compact and carefully filling the same around the tap-hole mold, so that when the same is withdrawn it will leave a tapering tap-hole D. I prefer in the formation of this tap-hole D to employ a piece of wood of desired form. When the same is thoroughly filled and tamped with the carbon mixture, the whole pot is then placed in an oven or furnace, where it is thoroughly baked until the carbon assumes a solid compact form and most of the volatile carbonaceous material has been dissipated. During the baking of this carbon lining the wooden molds and plugs are burned up or converted into charcoal. After the pot has been thoroughly baked, which usually takes about twelve hours, it is allowed to cool gradually, removed from the furnace, cleaned out, and it is ready for use.

In preparing a plug for the tap-hole I prefer to take a segregated carbohydrate or cellulose, such as wood-sawdust or paper-pulp, or a material made from the same, such as paper, and either compress the same with suitable binder, such as paste or size, in sufficient quantity or if paper material is employed to wrap the same in layers, the whole object being to produce a plug of carbonaceous material, as shown in E, Fig. 2, preferably of the carbohydrates, such as cellulose, which will, when heated, on exclusion of air, be converted into a porous friable charcoal, as shown at $b$, Fig. 3, and which when produced in the tap-hole of the pot when employed during process of reduction prevents the metal from escaping or becoming contaminated and may be easily removed without injuring the lining of the pot when it is desired to tap the same. I find that by employing this form of plug, as shown at E, Fig. 2, consisting of reconstructed carbohydrates or cellular matter capable of being transformed, when heated, into charcoal, I can accomplish the result desired, as before described, more cheaply and in a more economical and satisfactory manner than can be accomplished by the use of wood alone, which necessarily causes considerable waste of material in its shaping and formation. After forming this preparatory or "green" plug, so to speak, of oxyhydrocarbon I place it in the tap-hole D of a melting or reduction pot, as shown in Fig. 1, introduce a fusible material into the pot and fuse it, preferably by electric heat, whereupon the heat communicated to the inner end of the green plug E in the tap-hole D converts it in an outward direction into carbon or charcoal, as shown at $b$, Fig. 3, followed by a section of intermediate educts of destructive distillation of the constituents of the green or unfinished plug $a$ and backed by the undecomposed portion of the green plug E, which being such a distance from the source of heat remains practically unchanged in a long plug, thus constituting one of the component parts of the finished plug, as shown complete in Fig. 3, and acts as a medium for preventing the heated educts or intermediate compounds of destructive distillation from becoming ignited by excluding the air therefrom, so the same is not consumed by combustion. Should the green or unfinished plug introduced in the tap-hole D be so short that the heat communicated from the melting-pot should carbonize the whole or transform it into carbon and intermediate educts of destructive distillation, then I prefer to prevent it from igniting in its heated condition by application to it of a substance *c*, Fig. 5, such as clay, which will exclude the atmosphere therefrom.

It can be seen from the foregoing description that my invention consists in the combination, with a melting-pot, of a tap-hole plug composed of carbon, intermediate educts of destructive distillation of oxyhydrocarbons, and a substance capable of excluding the atmosphere from contact with the portion of the plug heated to an igniting degree while inserted in the tap-hole D and preferably produced from reconstructed carbohydrates, cellular matter, or other carbonaceous material of like character capable of being converted into charcoal when heated out of contact with oxygen, the portion of the plug heated to an igniting or carbonizing degree being excluded from the atmosphere by a material which prevents the transmission or passage through of oxygen in sufficient quantity to consume the same. This may be either by the excess of carbohydrate or material of which the plug is composed in cases where it is of sufficient length E, Fig. 3, or by the application to or coating of the exterior of said plug with a foreign substance or material capable of accomplishing the same result, as shown at *c*, Fig. 5.

In the continuous operation of a reduction-pot when enough metal has been reduced by electrical or other means the tap-hole plug is readily removed by withdrawing the same from the tap-hole and the metal withdrawn, after which another green plug is inserted, stopping the flow of fluxes, &c., and that by action of heat communicated at the inner end thereof in its position in the tap-hole being excluded from the atmosphere is converted into my improved tap-hole plug, as before described and as illustrated in Fig. 3. This composite tap-hole plug may be first made and inserted in the tap-hole of a melting or reduction pot; but I have found it advisable and preferable to produce it directly from a green plug within the tap-hole, as herein set forth.

It may be noted that in the making and employment of my improved tap-hole plug I start with a more dense and compact material than the resultant product, and the process of conversion from a dense to a friable nature, which admits of its being readily withdrawn when it is desired to tap or draw off the contents of the melting or reducing pot, constitutes an important feature of my invention, as in other cases it is found that the resultant product of the plugging medium is of more dense and vitreous nature than the original material employed, which occasions considerable loss when tapping, because it becomes necessary to forcibly drill out or through the same, thereby breaking and destroying the lining of the reducing or melting pot to a large and injurious degree.

The term "carbon" as employed throughout this specification and claims has reference to carbon—such as charcoal, coke, &c.—containing such contamination as small portions of alumina, potash, soda, &c., commonly known as "ash," as well as pure carbon *per se*, and the terms "reconstructed" and "reassociated" with reference to oxyhydrocarbons, such as cellulose, is intended to imply a compact body or substance composed or manufactured of pieces or particles of said material united in mass, and the term "oxyhydrocarbon" to a more or less dense composition, such as compressed sawdust or similar carbohydrate capable of transformation into a porous or less dense substance, such as charcoal or material of analogous nature by action of heat and exclusion of air.

The term "educt" employed herein is intended to imply the residual compound or substance left after separation, wholly or in part, of the volatile products generated by the action of heat on the raw material employed.

The following predominating features and distinctions of my improved tap-hole plug and process of making the same may be noted: First, the composition of which the green plug is composed being reassociated or reconstructed oxyhydrocarbon, such as sawdust, with or without additional binder of glue, size, or similar material, is such a bad conductor of heat that it is not readily transformed or decomposed by the action of heat, as wood, so that a shorter plug may be used without being wholly converted into charcoal; second, the finished plug being only partly converted into charcoal and having an exterior or adjoining portion of the more dense intermediate educts of destructive distillation assists in maintaining the position of the plug in the tap-hole against the weight or pressure of the molten materials in the melting pot or furnace, which plug would be more readily forced out if it consisted wholly of pure charcoal; third, the employment of a green plug of compressed sawdust with or without a binder produces when heated a tap-hole plug of such cohesive character that it can be readily wholly withdrawn intact when desired with one operation instead of having to be picked out in fragments, as is the case with pure charcoal, and thereby effecting a saving of time and more perfect operation without injuring the tap-hole or contaminating the withdrawn metal with particles of fine carbon; fourth, the finished plug consists of portions or sections of varying density—viz., the soft carbon or charcoal tip, the more dense intermediate educts of destructive distillation, and the still more dense exterior unconverted portion capable of excluding air from the portion which becomes heated to igniting temperature, whereby destruction by combustion is prevented—which consistence of sections of varying density renders it especially adaptable for a tap-hole plug, for the reasons hereinbefore fully set forth.

Having now described my invention, what I claim as new, and desire to secure by Letters Patent, is—

1. As an article of manufacture a tap-hole plug containing reassociated or reconstructed oxyhydrocarbon and carbon.

2. A tap-hole plug having a carbonized end and an adjoining portion containing intermediate educts of destructive distillation.

3. A tap-hole plug having a carbonized end and an adjoining portion containing intermediate educts of destructive distillation and a further cellular end portion.

4. A tap-hole plug consisting of carbon, intermediate educts of destructive distillation of carbohydrates, and a substance capable of excluding air from said educts of destructive distillation, the said component parts being arranged or stratified in the order mentioned as shown and described.

5. A tap-hole plug consisting of carbon, an adjoining portion of more dense character, and a portion impervious to the air, arranged in the order described and for the purpose set forth.

6. A tap-hole plug consisting of charcoal, an adjoining portion of partially-charred carbonaceous matter, and a further end portion of undecomposed carbonaceous matter, substantially as shown and described.

In testimony whereof I affix my signature in presence of two witnesses.

ANDREW DICKEY.

Witnesses:
HARRY R. KING,
C. C. WRIGHT.